United States Patent
Fang et al.

(10) Patent No.: US 12,412,345 B2
(45) Date of Patent: Sep. 9, 2025

(54) LOCATION PRECISION TECHNIQUES FOR ENHANCED DEPTH DATA IN WIRELESS COMMUNICATIONS

(71) Applicant: T-MOBILE INNOVATIONS LLC, Overland Park, KS (US)

(72) Inventors: Zheng Fang, McLean, VA (US); Zheng Cai, Fairfax, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 294 days.

(21) Appl. No.: 18/173,503

(22) Filed: Feb. 23, 2023

(65) Prior Publication Data

US 2024/0290044 A1    Aug. 29, 2024

(51) Int. Cl.
G06T 19/00    (2011.01)
H04N 21/4363    (2011.01)

(52) U.S. Cl.
CPC ..... *G06T 19/006* (2013.01); *H04N 21/43637* (2013.01)

(58) Field of Classification Search
CPC .................. G06T 19/006; G06T 15/00; G06T 2200/04; G06T 7/50; G06T 11/00; G06T 17/00; G06T 7/97; G06T 7/80; G06T 2207/10028
See application file for complete search history.

(56) References Cited

U.S. PATENT DOCUMENTS

2016/0198097 A1 * 7/2016 Yewdall ................. H04N 5/272
                                                                348/659
2019/0053012 A1 * 2/2019 Hill ......................... G06Q 10/04
2019/0266793 A1   8/2019 Sheffield et al.
(Continued)

FOREIGN PATENT DOCUMENTS

WO    2017/065883 A1    4/2017
WO    2017/117446 A1    7/2017

OTHER PUBLICATIONS

EP Communication received for European Application No. 24155572.1, mailed on Sep. 2, 2024, 2 pages.
Extended European Search Report received for European Application No. 24155572.1, mailed on Jun. 5, 2024, 10 pages.
Jiang et al., "Towards 3D Human Pose Construction Using Wifi", Conference on Mobile Computing and Networking, Sep. 21-25, 2020, 14 pages.

*Primary Examiner* — Hau H Nguyen
(74) *Attorney, Agent, or Firm* — SHOOK, HARDY & BACON L.L.P.

(57) ABSTRACT

The technology disclosed herein relates to generating a three-dimensional virtual entity using augmented reality, mixed reality, extended reality, another reality type, or one or more combinations thereof. The virtual entity is generated using two-dimensional image data and a depth measurement of the entity relative to the positioning of the entity within an image or video. The depth measurement is determined based on transmitting one or more radio frequencies toward the entity via one or more radio frequency transmitters based on the entity being identified using the image data. Further, the depth measurement is determined based on one or more radio frequency receivers receiving radio frequency data based on the one or more radio frequencies reflecting or refracting from the entity. The determined depth measurement is transmitted over a wireless telecommunications network for generating the three-dimensional entity. The radio frequency data may be transmitted over the wireless telecommunications network.

20 Claims, 4 Drawing Sheets

(56) References Cited

U.S. PATENT DOCUMENTS

2020/0294257 A1 9/2020 Yoo et al.
2021/0327079 A1* 10/2021 Morozov ............ H04N 13/254

* cited by examiner

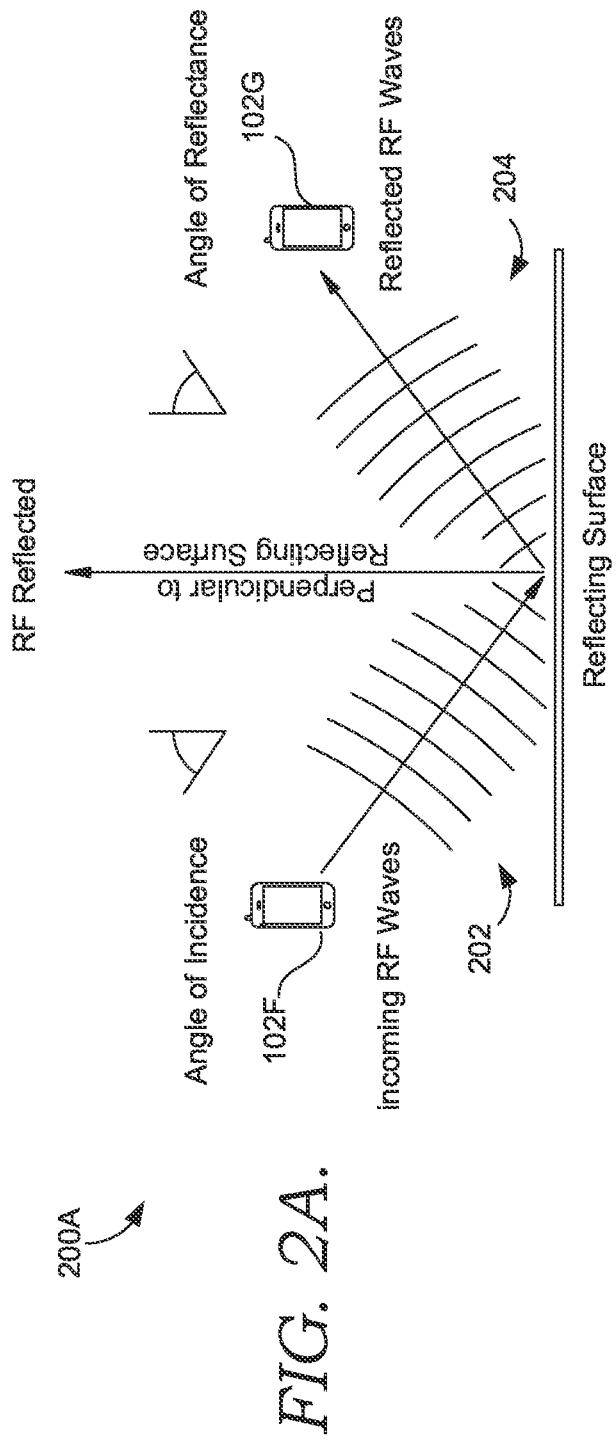
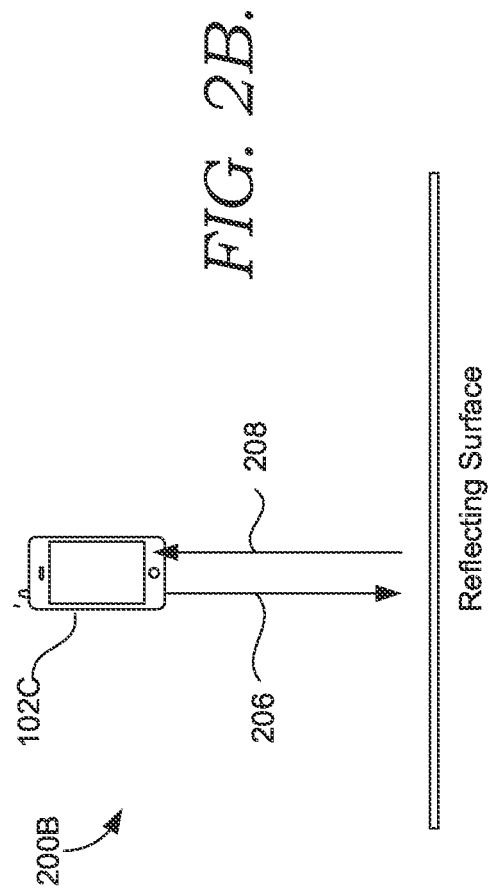

LOCATION PRECISION TECHNIQUES FOR ENHANCED DEPTH DATA IN WIRELESS COMMUNICATIONS

SUMMARY

A high-level overview of various aspects of the invention is provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to technology associated with positioning precision and techniques for enhanced depth data in wireless communications for entity recreations in three-dimensional virtual environments, substantially as shown in and/or described in connection with at least one of the figures, and as set forth more completely in the claims.

In aspects set forth herein, and at a high level, the technology described herein relates to generating a three-dimensional virtual entity using augmented reality, virtual reality, mixed reality, extended reality, or one or more combinations thereof. An "entity" discussed herein relates to something with a distinct and independent existence. For example, an entity may be a human, another organism, an object, another type of entity, or one or more combinations thereof. The three-dimensional virtual entity can be generated using two-dimensional image data and a depth measurement of the entity relative to the positioning of the entity corresponding to the image data. For example, the depth measurement of the entity can be relative to the positioning of the entity within an image or video.

The depth measurement is determined based on transmitting one or more radio frequency signals toward the entity via one or more radio frequency transmitters and in response to the entity being identified using the image data. In embodiments, the radio frequency transmitter may use one antenna or a set of a plurality of antennas. In some embodiments, the radio frequency transmitter is collocated with one or more radio frequency receivers. In some embodiments, the radio frequency transmitter is coupled to receiver circuitry. The radio frequency transmitter can be configured to transmit signals or channels toward the identified entity (e.g., wave signals generated by an antenna component of a user device). The radio frequency transmitter, the radio frequency receiver, or one or more combinations thereof, may have components including one or more low-noise amplifiers, one or more power-amplifiers, one or more duplexers, one or more diplexers, one or more filters or filter circuitry, one or more converters, one or more mixers, another type of component, or one or more combinations thereof. In some embodiments, the radio frequency transmitter, the radio frequency receiver, or one or more combinations thereof, may have one or more antennas, such as a horn antenna, a dipole antenna, a patch antenna, another type of antenna, or one or more combinations thereof.

Further, the depth measurement is determined based on the one or more radio frequency receivers receiving radio frequency data (e.g., an incident angle, a reflection angle, a refraction angle, a delay between transmission and receipt associated with a corresponding radio frequency signal) based on the one or more radio frequencies reflecting (e.g., bouncing) or refracting from the entity. In embodiments, the depth measurement depends upon a separation distance between the radio frequency transmitter and the radio frequency receiver. Additionally, the depth measurement can depend upon the surface of the entity, the material of the surface of the entity, location and positioning of the radio frequency transmitter and receiver, an angular resolution of the image sensor capturing the two-dimensional image data of the entity, an incidence angle corresponding to the one or more radio frequency signals transmitted by the radio frequency transmitter, permittivity of the surface of the entity, other related factors (e.g., other characteristics of the surface of the entity), or one or more combinations thereof.

The determined depth measurement can be transmitted over a wireless telecommunications network for generating the three-dimensional entity. In some embodiments, the radio frequency data received is transmitted over the wireless telecommunications network, and another device (such as a user device, for example) determines the depth measurement based on the radio frequency data received and the two-dimensional image data received over the wireless telecommunications network. The three-dimensional virtual entity can be generated using the depth measurement and the two-dimensional image data using augmented reality, virtual reality, mixed reality, extended reality, another type of multi-dimensional entity generation reality, or one or more combinations thereof.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein:

FIGS. 2A-2B depict another example operating environment for receiving radio frequency data based on one or more radio frequency signals reflecting from an entity, in accordance with aspects herein;

DETAILED DESCRIPTION

Figure 1:
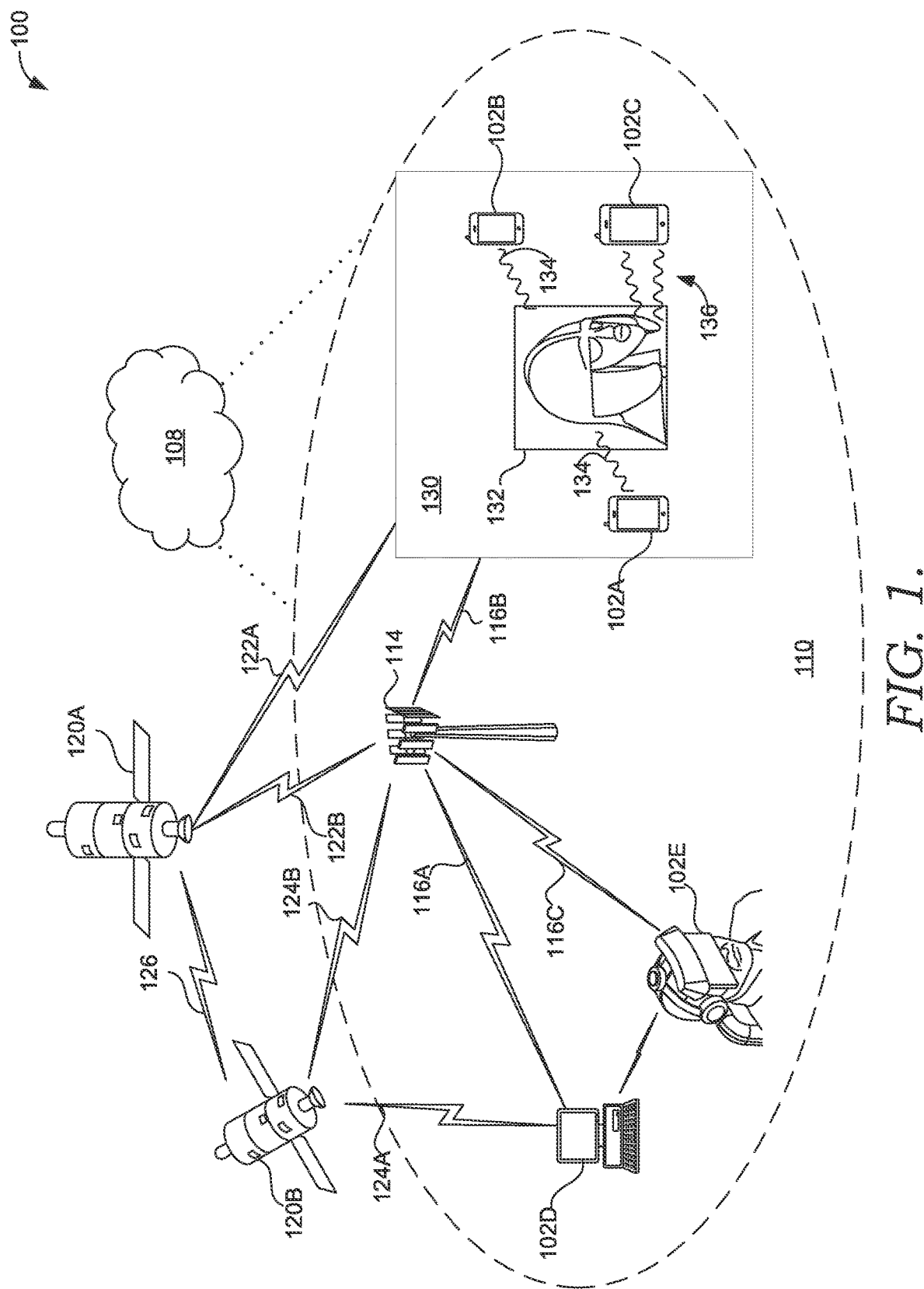
FIG. 1 depicts an example operating environment for determining a depth measurement of an entity within two-dimensional image data for generating a recreation of the entity virtually in three-dimensions, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Cellular Communication System
4G Fourth-Generation Cellular Communication System
5G Fifth-Generation Cellular Communication System
CD-ROM Compact Disk Read Only Memory
CDMA Code Division Multiple Access
eNB Evolved Node B
gNB Next Generation Node B
GPRS General Packet Radio Service
GSM Global System for Mobile communications
DVD Digital Versatile Discs
EEPROM Electrically Erasable Programmable Read Only Memory
E-UTRA Evolved Universal Terrestrial Radio Access
FD-MIMO Full-Dimension Multiple-Input Multiple-Output
GPS Global Positioning System
IoT Internet of Things
LAN Local Area Network
LTE Long Term Evolution
MIMO Multiple-Input Multiple-Output
mm Wave Millimeter waves
MU-MIMO Multi-User Multiple-Input Multiple-Output
NR New Radio
PC Personal Computer
PDA Personal Digital Assistant
RAM Random Access Memory
RF Radio-Frequency
ROM Read Only Memory
SNR Signal-to-Noise Ratio
TDMA Time Division Multiple Access
VLAN Virtual Local Area Network In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Further, the term "some" may refer to "one or more." Additionally, an element in the singular may refer to "one or more."

The term "combination" (e.g., a combination thereof, combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

Additionally, a "user device," as used herein, is a device that has the capability of using a wireless communications network, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A user device may be, in an embodiment, similar to user devices 102A-102E described herein with respect to FIG. 1.

In embodiments, a user device may include internet-of-things devices, such as one or more of the following: a sensor, controller (e.g., a lighting controller, a thermostat), appliances (e.g., a smart refrigerator, a smart air conditioner, a smart alarm system), other internet-of-things devices, or one or more combinations thereof. Internet-of-things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, other wireless communication devices, or one or more combinations thereof. In some aspects, the user device is a wearable device having a camera, microphone, RFID, GPS, another sensor, or one or more combinations thereof, to capture data in real-time or near real-time (e.g., one or more strings of text, image data, video data, audio data, location data, other types of data, or one or more combinations thereof).

The wearable devices and other user devices, for example, can transmit the data obtained by their corresponding sensors to other user devices. For example, the sensor data obtained by a user device can be further transmitted for another user device to perform positional tracking (e.g., six degrees of freedom positional tracking) associated with the user device capturing the sensor data in real-time. In embodiments, a user device can access sensors, application data, tracking data, map data, other user device data, or one or more combinations thereof, for packet transmissions to a user device. In some embodiments, a wearable device can be a watch-type electronic device, a glasses-type wearable device, an upper-torso wearable device (e.g., a shirt having sensors affixed on or within the material of the shirt or a device that is attachable to the shirt), another type of wearable device, or one or more combinations thereof.

In aspects, a user device discussed herein may be configured to communicate using one or more of 4G (e.g., LTE), 5G, 6G, another generation communication system, or one or more combinations thereof. In some aspects, the user device has components to establish a 5G connection with a 5G gNB, and to be served according to 5G over that connection. In some aspects, the user device may be an E-UTRAN New Radio-Dual Connectivity (ENDC) device. ENDC allows a user device to connect to an LTE eNB that acts as a master node and a 5G gNB that acts as a secondary node. As such, in these aspects, the ENDC device may access both LTE and 5G simultaneously, and in some cases, on the same spectrum band.

"Wireless telecommunication services" refer to the transfer of information without the use of an electrical conductor as the transferring medium. Wireless telecommunication services may be provided by one or more telecommunication network providers. Wireless telecommunication services may include, but are not limited to, the transfer of information via radio waves (e.g., Bluetooth®), satellite communication, infrared communication, microwave communication, Wi-Fi, mmWave communication, and mobile communication. Embodiments of the present technology may be used with different wireless telecommunication technologies or standards, including, but not limited to, CDMA 1×Advanced, GPRS, Ev-DO, TDMA, GSM, WiMAX technology, LTE, LTE Advanced, other technologies and standards, or one or more combinations thereof.

A "network" providing the telecommunication services (e.g., network 108 of FIG. 1) may be one or more telecommunications networks, or a portion thereof. The telecommunications network might include an array of devices or components (e.g., one or more base stations). The network can include multiple networks, and the network can be a network of networks. In embodiments, the network or a portion thereof is a core network, such as an evolved packet core, which may include at least one mobility management entity, at least one serving gateway, and at least one Packet Data Network gateway. The mobility management entity may manage non-access stratum (e.g., control plane) functions such as mobility, authentication, and bearer management for other devices associated with the evolved packet core.

In some aspects, a network can connect one or more user devices to a corresponding immediate service provider for services such as 5G and LTE, for example. In aspects, the network provides wireless telecommunication services comprising one or more of a voice service, a message service (e.g., SMS messages, MMS messages, instant messaging messages, an EMS service messages), a data service, other types of wireless telecommunication services, or one or more combinations thereof, to user devices or corresponding users that are registered or subscribed to a telecommunication service provider to utilize the one or more services. The network can comprise any communication network providing voice, message, or data service(s), such as, for example, a 1× circuit voice, a 3G network (e.g., CDMA, CDMA2000, WCDMA, GSM, UMTS), a 4G network (WiMAX, LTE, HSDPA), a 5G network, a 6G network, another generation network, or one or more combinations thereof.

Components of the telecommunications network, such as terminals, links, and nodes (as well as other components), can provide connectivity in various implementations. For example, components of the network may include core network nodes, relay devices, integrated access and backhaul nodes, macro eNBs, small cell eNBs, gNBs, relay base stations, other network components, or one or more combinations thereof. The network may interface with one or more base stations through one or more wired or wireless backhauls. As such, the one or more base stations may communicate to devices via the network or directly. Furthermore, user devices can utilize the network to communicate with other devices (e.g., a user device(s), a server(s), etc.) through the one or more base stations.

As used herein, the term "base station" (used for providing UEs with access to the telecommunication services) generally refers to one or more base stations, nodes, RRUs control components, and the like (configured to provide a wireless interface between a wired network and a wirelessly connected user device). A base station may comprise one or more nodes (e.g., eNB, gNB, and the like) that are configured to communicate with user devices. In some aspects, the base station may include one or more band pass filters, radios, antenna arrays, power amplifiers, transmitters/receivers, digital signal processors, control electronics, GPS equipment, and the like. A base station may be, in an embodiment, similar to base station 114 described herein with respect to FIG. 1.

For example, the base station may refer to a base transceiver station, a radio base station, an access point, a radio transceiver, a NodeB, an eNB, a gNB, a Home NodeB, a Home eNodeB, another type base station, or one or more combinations thereof. A node corresponding to the base station may comprise one or more of a macro base station, a small cell or femtocell base station, a relay base station, another type of base station, or one or more combinations thereof. In aspects, the base station may be configured as FD-MIMO, massive MIMO, MU-MIMO, cooperative MIMO, 3G, 4G, 5G, another generation communication system, or one or more combinations thereof. In addition, the base station may operate in an extremely high frequency region of the spectrum (e.g., from 30 GHz to 300 GHz), also known as the millimeter band.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior relevant technologies have had drawbacks associated with providing augmented reality environments and other similar reality environments to users that reflect objects from the real-world environment. For example, prior relevant technologies display their reality environments having real-world objects that are too far or too close to the user who is viewing the environment. Some objects are displayed at a closer proximity to a user within the environment, and do not include appropriate visual details of the object with respect to the proximity of the user (e.g., distorted coloring that does not reflect the object in the real-world environment, lack of detail to the shape of the object). Other objects are displayed at a further distance and also fail to include appropriate visual details (e.g., the shape of the object is distorted because the object is compressed in size at a further distance from the user compared to where the object data was captured in the real-world). Furthermore, most three-dimensional objects created from the captured object data only include two-dimensional data and do not include any corresponding depth data, thus further obscuring the augmented reality object within the augmented reality environment.

The technology provided herein can alleviate the problems discussed above. For example, the technology disclosed herein enhances the details to the objects displayed within an augmented, extended, or mixed reality, by making enhanced depth determinations from radio frequency data received in response to the radio frequency signal reflecting or refracting from the entity; thereby improving the efficiency and reliability of augmented, extended, or mixed reality environments and user experiences. In addition, the technology disclosed herein can improve communications between or among devices by improving quality of service and user experience. Further, the technology and corresponding techniques can enhance the reliability and functionality of communications and can also result in efficient and enhanced reproductions of events captured by various sensors or user devices in particular locations.

In an embodiment, a system is provided for recreating an event in three-dimensions from two-dimensional image data using a wireless telecommunications network. The system comprises an image sensor, a radio frequency transmitter, a radio frequency receiver, one or more processors, and computer memory storing computer-usable instructions that, when executed by the one or more processors, cause the system to perform operations. The operations comprise receiving the two-dimensional image data from the image sensor and identifying an entity within the event based on the two-dimensional image data. Based on identifying the entity, one or more radio frequency signals are transmitted toward the entity from the radio frequency transmitter. The operations also comprise receiving radio frequency data at the radio frequency receiver based on the one or more radio frequency signals reflecting or refracting from the entity. The operations also comprise determining a depth measurement of the entity based on the radio frequency data received and transmitting the depth measurement and the two-dimensional image data over the wireless telecommunications network for a three-dimensional recreation of the entity within the event.

In another embodiment, a method is provided for generating a three-dimensional recreation of an entity. The method comprises receiving image data from an image sensor and identifying the entity based on the image data. Based on identifying the entity, one or more radio frequencies are transmitted toward the entity via one or more radio frequency transmitters. Radio frequency data is received at a radio frequency receiver based on the one or more radio frequencies reflecting or refracting from the entity. The method also comprises determining a depth measurement of the entity based on the radio frequency data received and transmitting the depth measurement and the image data over a wireless telecommunications network. The three-dimensional recreation of the entity is generated using the depth measurement and the image data.

Another embodiment includes one or more non-transitory computer storage media having computer-executable instructions embodied thereon, that when executed by at least one processor, cause the at least one processor to perform a method. The method comprises receiving two-dimensional image data from an image sensor and identifying an entity corresponding to the two-dimensional image data. The method also comprises transmitting, based on identifying the entity, a plurality of radio frequency signals toward the entity from at least one of a plurality of radio frequency transmitters. The method also comprises receiving radio frequency data at a first radio frequency receiver based on a first radio frequency signal, of the plurality of radio frequency signals, reflecting or refracting from the entity. The method also comprises determining a depth measurement of the entity for the two-dimensional image data based on the radio frequency data received at the first radio frequency receiver and causing transmission of the depth measurement and the two-dimensional image data over a wireless telecommunications network for a three-dimensional recreation of the entity.

Those skilled in the art will appreciate that the computing devices described herein need not be limited to conventional personal computers, and can include other computing configurations, including servers, hand-held devices, multi-processor systems, a microprocessor based or programmable consumer electronics, network PCs, minicomputers, mainframe computers, other computing devices, or one or more combinations thereof. Similarly, the computing devices need not be limited to stand-alone computing devices, as the mechanisms may also be practiced in distributed computing environments where tasks are performed by remote processing devices that are linked through a wireless telecommunications network. In a distributed computing environment, program modules may be located in both local and remote memory storage devices.

Turning now to FIG. 1, example environment 100 supports the generation of three-dimensional recreations of one or more entities (e.g., within an augmented reality, mixed reality, extended reality) using two-dimensional image data and one or more determined depth measurements from one or more reflected or refracted radio frequency signals, in accordance with one or more embodiments disclosed herein. Example environment 100 is but one example of a suitable environment for the improved depth determinations and corresponding three-dimensional recreations disclosed herein, and is not intended to suggest any limitation as to the scope of use or functionality of the invention. Neither should the environment 100 be interpreted as having any dependency or requirement relating to any one or combination of components illustrated.

Example environment 100 includes user devices 102A-102E, communication link 106 between user device 102D and user device 102E, network 108, coverage area 110, base station 114, terrestrial communication links 116A-116C associated with the base station 114, satellites 120A and 120B, communication links 122A and 122B associated with satellite 120A, communication links 124A and 124B associated with satellite 120B, communication link 126 between satellites 120A and 120B; and museum environment 130 comprising user devices 102A-102C, museum artifact 132, refracted radio frequency signal 134 received by user device 102A that was transmitted by user device 102B, and reflected radio frequency signal 136 that was transmitted and received by user device 102C.

Example environment 100 having network 108 and coverage area 110 may be associated with one or more of a non-terrestrial network, an LTE network, an LTE-A network, an LTE-A Pro network, an NR network, an mmWave network, another type of network, or one or more combinations thereof. In some embodiments, the example environment 100 may support enhanced broadband communications, ultra-reliable (e.g., mission critical) communications, low latency communications, communications with low-cost and low-complexity devices, another type of communication, or one or more combinations thereof. In some embodiments, one or more of the radio frequencies signals 134 and 136 may correspond to the enhanced broadband communication, ultra-reliable communication, low latency communication, another type of communication, or one or more combinations thereof.

In embodiments, example environment 100 can utilize both licensed and unlicensed radio frequency bands. For example, the example environment 100 may employ License Assisted Access, LTE-Unlicensed radio access technology, or NR technology in an unlicensed band (e.g., 5 GHz industrial, scientific, and medical band). When operating in unlicensed radio frequency bands, base stations, satellites, or user devices may employ carrier sensing for collision avoidance and detection. In some examples, operations in unlicensed bands may be based on a carrier aggregation configuration and component carriers operating in a licensed band. Operations in unlicensed spectrum may include downlink transmissions, uplink transmissions, P2P transmissions, D2D transmissions, another type of unlicensed spectrum operation, or one or more combinations thereof. As such, one or more of the radio frequency signals 134 and 136 (within museum environment 130) may correspond to a licensed or unlicensed radio frequency band, a 5 GHz industrial band, a 5 GHz scientific band, a 5 GHz medical band, a particular carrier aggregation configuration of a licensed band, a P2P transmission, a D2D transmission, another type of spectrum operation, or one or more combinations thereof.

In embodiments, user devices 102A-102E may wirelessly communicate via one or more wireless telecommunication services provided by one or more base stations (e.g., base station 114), one or more satellites (e.g., satellites 120A and 120B), other types of wireless telecommunication devices, or one or more combinations thereof. In example environment 100, network 108, base station 114, and satellites 120A-120B can provide coverage area 110 for supporting communication signals according to one or more radio access technologies. Supported communication signals within coverage area 110 can include MU-MIMO and SU-MIMO transmissions, for example. As such, one or more of the radio frequency signals 134 and 136 (within museum environment 130) may correspond to the wireless telecommunication services provided within coverage area 110.

In embodiments, the user devices 102A-102E can be stationary, mobile, or one or more combinations thereof at different times. The user devices 102A-102E may be able to communicate with various types of devices, such as other UEs, various types of base stations, or various types of network equipment (e.g., core network nodes, relay devices, integrated access and backhaul nodes, other network equipment, or one or more combinations thereof). In embodiments, one or more of the user devices 102A-102E may have different capabilities. For example, as illustrated in example environment 100, user devices 102D and 102E can be devices in different forms or devices having different capabilities. Continuing this example, user device 102E can be wearable devices having a camera, microphone, RFID, GPS, another sensor, or one or more combinations thereof. In some embodiments, one or more of user devices 102A-102E can capture data in real-time or near real-time (e.g., one or more strings of text, two-dimensional image data, two-dimensional image data from video data, acoustic data, radio frequency data, location data, other types of data, or one or more combinations thereof). As such, one or more of the radio frequency signals 134 and 136 (within museum environment 130) may be radio frequency signals from devices in different forms or devices having different capabilities, or transmissions from (or received by) one or more wearable devices having a microphone, RFID, GPS, another sensor or transmitter component, or one or more combinations thereof.

In some embodiments, the user device 102E that is a wearable device can be a watch-type electronic wearable device, a glasses-type wearable device, an upper-torso wearable device (e.g., a shirt having sensors affixed on or within the material of the shirt or a device that is attachable to the shirt), another type of wearable device, or one or more combinations thereof. Further, the data captured by one or more of user devices 102A-102C at the museum environment 130 (e.g., the one or more strings of text captured using optical character recognition, two-dimensional image data captured using an image sensor, two-dimensional image data from video data captured via an image sensor, acoustic data captured from an acoustic receiver, radio frequency data received via a radio frequency receiver, location data, data captured in real-time or near real-time, other types of captured data, or one or more combinations thereof) can be transmitted over the wireless telecommunication network and to the user device 102D or 102E for the three-dimensional recreation of the museum artifact 132 for display at the user device 102E (e.g., via augmented reality, mixed reality, extended reality).

In embodiments, one or more of the user devices 102A-102E may include one or more of a unit, a station, a terminal, or a client, for example. The user devices 102A-102E may also include a wireless local loop station, an IoT device, an Internet of Everything device, a machine type communication device, an evolved or enhanced machine type communication device, another type of user device, or one or more combinations thereof. The machine type communication device or the evolved or enhanced machine type communication device may include, for example, one or more robots, drones, remote devices, sensors, meters, monitors, location tags, etc., that may communicate with a base station, another device (e.g., remote device), or some other entity. In some embodiments, a user device may be implemented in various objects such as appliances, vehicles, meters, or other objects. In some embodiments, one or more of the user devices 102A-102E may, at one time or another, act as a relay, base station, (e.g., a UAV acting as an aerial base station), or the network equipment (e.g., macro eNBs or gNBs, small cell eNBs or gNBs, or relay base stations). As such, one or more of the radio frequency signals 134 and 136 (within museum environment 130) may correspond to radio frequency signals from the unit, station, terminal, client, a wireless local loop station, an IoT device, an Internet of Everything device, a machine type communication device, an evolved or enhanced machine type communication device, a user device implemented in an object, another type of user device, or one or more combinations thereof.

Coverage area 110 can provide services from network 108, such as network provider services including the Internet, Intranet, Internet Protocol Multimedia Subsystem, Packet-Switched Streaming Service, another type of network provider service, or one or more combinations thereof. In embodiments, user devices 102A-102C having one or more radio frequency transmitters or receivers and located within museum environment 130 can be configured to support ultra-reliable communications, low-latency communications, mission critical communications, ultra-reliable low-latency communications, ultra-reliable functions, low-latency functions, critical functions, mission critical push-to-talk functions, mission critical video functions, other types of communications, or one or more combinations thereof. As such, one or more radio frequency receivers of the user devices 102A-102C can receive radio frequency data corresponding to ultra-reliable radio frequencies, low-latency radio frequencies, mission critical radio frequencies, ultra-reliable low-latency radio frequencies, other types of radio frequencies, or one or more combinations thereof. In addition, the one or more of the radio frequencies signals 134 and 136 (within museum environment 130) may correspond to a network provider service (e.g., Internet, Intranet, Internet Protocol Multimedia Subsystem, Packet-Switched Streaming Service).

User devices 102A-102C may include one or more image sensors for receiving or generating image data (e.g., two-dimensional image data) and a network interface for transmitting the image data over the wireless telecommunications network 108 to one or more of user devices 102D-102E. Additionally, user devices 102A-102C can also can transmit ultra-reliable data, low-latency data, critical data, mission critical push-to-talk data, mission critical image data, acoustic data, other types of data related to the museum environment 130 (e.g., other museum artifacts not illustrated in example environment 100), or one or more portions thereof, via one or more uplink communications with base station 114, satellite 120A, network 108, another device, or one or more combinations thereof. As such, one or more of the user devices 102D-102E can receive the image data, ultra-reliable data, low-latency data, critical data, mission critical push-to-talk data, mission critical image data, acoustic data, or other data related to the museum environment 130. In one example embodiment, user device 102D can use this received data for generating the three-dimensional recreation of the entity (e.g., museum artifact 132) and for subsequently displaying the three-dimensional recreation of the entity virtually via one or more displays of user device 102E (e.g., a wearable user device).

As used herein, "image data" can include ultra-reliable image data, low-latency image data, critical image data, mission critical image data, other types of image data, or one or more combinations thereof. Additionally, or alternatively, image data can include frame-based image data, video frame data, encoded video data, image or video sensor-mode setting data, zoom setting data, other types of image data, or one or more combinations thereof. Further, image data can also include pixel data, focus data, or one or more combinations thereof. In embodiments, the image data corresponds to a file format (such as Joint Photographic Experts Group (JPEG), Graphics Interchange Format (GIF), standards for bitmap (BMP), Tagged Image File Format (TIFF), another type of file format usable for images (e.g., some of which may be converted to a different format before processing the image), or one or more combinations thereof). In embodiments, image data (e.g., ultra-reliable image data, low-latency image data, critical image data, mission critical image data, frame-based image data, video frame data, encoded video data, image or video sensor-mode setting data, zoom setting data, JPEG data, GIF data, BMP data, TIFF data, other types of image data, or one or more combinations thereof) captured within museum environment 130 by one or more of user devices 102A-102C can be transmitted over the wireless telecommunications network 108 for the generation of the three-dimensional recreation of the entity (e.g., the museum artifact 132).

As used herein, an "image sensor" can capture one or more digital images (e.g., one or more still images, one or more sequences of images, video frames, other image types, or one or more combinations thereof). In embodiments, the image sensor (e.g., of one or more of the user devices 102A-102C) can include one or more of a digital camera sensor, a digital video sensor, an optical character recognition sensor, an x-ray sensor, a computed tomography sensor, a magnetic resonance sensor, an ultrasound sensor, a positron-emission tomography sensor, another type of medical imaging sensor, another type of magnetic particle imaging sensor, a 3-D scanning sensor, another type of image sensor, or one or more combinations thereof. In embodiments, image data (e.g., captured by the digital camera sensor, digital video sensor, optical character recognition sensor, x-ray sensor, computed tomography sensor, magnetic resonance sensor, ultrasound sensor, positron-emission tomography sensor, 3-D scanning sensor) within museum environment 130 can be transmitted over the wireless telecommunications network 108 for the generation of the three-dimensional recreation of the entity (e.g., the museum artifact 132).

In embodiments, an image sensor can be a sensor that detects and conveys image data for generating an image and two-dimensional image data. In embodiments, one or more image sensors of one or more of the user devices 102A-102C may comprise an active-pixel sensor, a complementary metal oxide semiconductor image sensor, an N-channel metal oxide semiconductor image sensor, a P-channel metal oxide semiconductor image sensor, a dynamic vision sensor, a charge-coupled device image sensor, an optical character recognition sensor, a programmable gain amplifier, a range sensor, a thermal imaging sensor, a radar sensor, an ultrasonic sensor, an mmWaves radar sensor, another type of image sensor, or one or more combinations thereof. In some embodiments, one or more of the image sensors may be a rolling shutter sensor (e.g., a sensor that does not expose a whole frame at once, but instead scans each line of the frame, such that the line scanning frequency of the sensor is higher than the frame rate of the sensor), a global shutter sensor, or one or more combinations thereof. In embodiments, image data (e.g., captured by the active-pixel sensor, complementary metal oxide semiconductor image sensor, N-channel metal oxide semiconductor image sensor, P-channel metal oxide semiconductor image sensor, dynamic vision sensor, charge-coupled device image sensor, optical character recognition sensor, programmable gain amplifier, range sensor, thermal imaging sensor, radar sensor, ultrasonic sensor, mmWaves radar sensor, rolling shutter sensor, global shutter sensor) within museum environment 130 can be transmitted over the wireless telecommunications network 108 for the generation of the three-dimensional recreation of the entity (e.g., the museum artifact 132).

In some embodiments, one or more of user devices 102A-102C can perform focusing techniques (e.g., by using a range sensor). In embodiments, a user device having one or more image sensors may perform an auto-focus technique associated with a range between the image sensor and an entity within a captured image. An auto-focus technique may include phase-difference detection auto-focus (e.g., by using a phase-difference detection sensor and a phase-difference detection auto-focus processor), contrast detection auto-focus, or one or more combinations thereof. In embodiments, an image sensor may include an array of pixels comprising imaging pixels. In some embodiments, the array of pixels also includes focus pixels. In some embodiments, the array of pixels includes an array of photodiodes (e.g., photodiodes of focus pixels). In embodiments, the image data corresponding to the phase-difference detection auto-focus, contrast detection auto-focus, other focusing techniques, or one or more combinations thereof, can be transmitted over the wireless telecommunications network 108 for the generation of the three-dimensional recreation of the entity (e.g., the museum artifact 132).

In embodiments, one or more of the user devices 102A-102E may include an image processor or an image processing unit for processing the image data (e.g., frame-based image data, frames of video data, encoded video data, sensor-mode setting data, zoom setting data, 3A parameter data). Additionally or alternatively, an image processor can process packet-based image data (e.g., received from a dynamic vision sensor). In some embodiments, the image processor can perform formatting, color interpolation, color correction, auto white balance, color saturation correction, gamma correction, hue correction, bad pixel correction, another type of processing, or one or more combinations thereof. Additionally or alternatively, the image processor can correct a hot pixel, a timestamp value of a noise pixel, or a dead pixel (e.g., via a temporal correlation between timestamp values of adjacent pixels of the dynamic vision sensor). In embodiments, the image data processed by the image processor or image processing unit (e.g., corresponding to the processed packet-based image data, formatting, color interpolation, color correction, auto white balance, color saturation correction, gamma correction, hue correction, bad pixel correction, hot pixel, timestamp values, dead pixels, another type of processed image data, or one or more combinations thereof) can be transmitted over the wireless telecommunications network 108 for the generation of the three-dimensional recreation of the entity (e.g., the museum artifact 132).

In embodiments, one or more of the user devices 102A-102E may also have one or additional processors (e.g., one or more acoustic processors) capable of processing acoustic data and other types of ultra-reliable data, low-latency data, critical data, mission critical push-to-talk data, mission critical data, other types of data, or one or more combinations thereof. In some embodiments, the one or more processors or processing units of a user device may include a system-on-a-chip, a processor core, a graphics processor unit, a central processing unit, an accelerator (e.g., a digital signal processor, a graphics accelerator, a compression accelerator, an artificial intelligence accelerator), a chipset processor, a general-purpose processor, a general-purpose graphics processor unit, an accelerated processing unit, a field-programmable gate array, a neural network processing unit, a data processor unit, a controller, another type of processor or processor unit, or one or more combinations thereof. In some embodiments, a processor unit may be located in a single integrated circuit component (e.g., multi-chip module) or in separate integrated circuit components.

In embodiments, one or more of the user devices 102A-102C transmit image data captured within museum environment 130 (e.g., frame-based image data, frame-based video data, encoded video data, image or video sensor-mode setting data, image or video zoom setting data, 3A parameter data, packet-based image data, image or video formatting, color interpolation data, color correction data, auto white balance data, color saturation correction data, gamma correction data, hue correction data, bad pixel correction data, mission critical video data, ultra-reliable video data, hot pixel data, timestamp values (e.g., of a noise pixel or a dead pixel)) or acoustic data captured within museum environment 130 (e.g., mission critical push-to-talk data), which was processed via the one or more processors or processing units (e.g., a system-on-a-chip, a processor core, a graphics processor unit, a central processing unit, an accelerator, a chipset processor, a field-programmable gate array, a neural network processing unit), over wireless telecommunications network 108 to user device 102D for generation of the three-dimensional recreation of the entity via a display of user device 102E. In one example embodiment, one or more of user devices 102A-102C within museum environment 130 capture museum environment data using a camera, microphone, RFID, GPS, another sensor, or one or more combinations thereof, and transmit the museum environment data over wireless telecommunications network 108 to user device 102D for the generation of the three-dimensional recreation of the entity (e.g., museum artifact 132).

In embodiments, a depth measurement relative to the image data is determined based on one or more radio frequency transmitters transmitting one or more radio frequencies toward the entity (e.g., the museum artifact 132) and based on one or more radio frequency receivers receiving radio frequency data from the one or more radio frequencies reflecting or refracting from the entity. For example, the depth measurement can be determined based on one or more of the refracted radio frequency signal 134 received by user device 102A that was transmitted by user device 102B and the reflected radio frequency signal 136 that was transmitted and received by user device 102C. In other embodiments, one or more depth measurements can be determined based on a plurality of refracted radio frequency signals (e.g., transmitted or received by one or more of user devices 102A-102C), a plurality of reflected radio frequency signals (e.g., transmitted or received by one or more of user devices 102A-102C), or one or more combinations thereof. In some embodiments, the one or more depth measurements can be determined for one or more images or one or more videos captured by one or more image sensors (e.g., of user device 102A, 102B, 102C, or another device).

In embodiments, each of the radio frequency transmitters and receivers are components of one or more of the user devices 102A-102C. In some embodiments, one or more of the radio frequency transmitters and receivers are components separate from the one or more of the user devices 102A-102C. In embodiments, the one or more of the radio frequency transmitters generate a radio frequency signal in a radio frequency band from a digital signal. In some embodiments, the digital signal is converted to an analog signal via a digital-to-analog converter. In some embodiments, the analog signal is transmitted based on a plurality of amplifiers and capacitors in a radio frequency band. In some embodiments, a power amplifier amplifies the radio frequency signal toward the entity identified using at least the image data. In some embodiments, the radio frequency receiver includes a receiver circuit coupled to an antenna of the radio frequency transmitter, such that the antenna can also receive radio frequency signals.

In embodiments, a frequency synthesizer is coupled to the transmitter circuit and the receiver circuit for receiving radio frequency data including oscillation signals at one or more oscillation frequencies based on the one or more radio frequency signals reflecting or refracting from the entity. As such, the depth measurement, of the entity corresponding to the image data, can be determined using the oscillation signals or the oscillation frequencies (e.g., a non-integer multiple of the radio frequency signal or an integer multiple of the radio frequency signal) of the one or more radio frequency signals reflecting or refracting from the entity. In one non-limiting example, the radio frequency signal may be 2.4 GHz, and an integer multiple of that radio frequency is 2 (4.8 GHz). In some embodiments, the radio frequency transmitter and receiver can be coupled to a radar circuitry (e.g., frequency modulated continuous wave radar circuitry, phase coded radar circuitry, orthogonal frequency-division multiplexing radar circuitry, frequency-stepped continuous wave radar circuitry), which can be used for determining the depth measurement in response to the radio frequency signals reflecting or refracting from the entity. In some embodiments, a radio frequency antenna of the radio frequency transmitter or receiver can comprise an integrated radio frequency antenna, a patch antenna, a micro strip antenna, a printed antenna, another type of radio frequency antenna, or one or more combinations thereof. In some embodiments, the radio frequency receiver can receive radio frequency data of a modulated carrier signal, a radio wave signal, or one or more combinations thereof, that reflected or refracted from the entity.

In embodiments, the "radio frequency data" used to determine the depth measurement may include one or more of a type of radio frequency transmitter (e.g., an integrated radio frequency antenna, a patch antenna), the frequency of the radio frequency transmitted, the frequency received at the radio frequency receiver, a type of the radio frequency receiver (e.g., a Bluetooth receiver), incident angle, reflection angle, refraction angle, delay between transmission and receipt associated with a corresponding radio frequency signal, antenna power associated with the radio frequency signal, separation distance between the radio frequency transmitter and receiver, locations of the radio frequency transmitter and receiver, an external temperature associated with the environment of the entity (e.g., the temperature of the museum environment 130), velocity of the radio frequency transmitted, velocity of the signal received, displacement amplitude, intensity associated with the radio frequency signal, intensity of the signal received, permittivity of the reflective surface of the entity in which the radio frequency signal reflected or refracted, measured reflection coefficients, reflection loss, refraction loss, radio frequency signal pattern, partition loss, other types of radio frequency data, or one or more combinations thereof.

In some embodiments, one or more of a plurality of radio frequency transmitters is a Wi-Fi transmitter and one or more of a plurality of the radio frequency receivers is a Wi-Fi receiver. In some embodiments, one or more of a plurality of radio frequency transmitters is a Bluetooth transmitter and one or more of a plurality of the radio frequency receivers is a Bluetooth receiver. In some embodiments, one or more of a plurality of radio frequency transmitters is a 5G NR transmitter and one or more of a plurality of the radio frequency receivers is a 5G NR receiver. In some embodiments, a radio frequency transmitter is an omnidirectional antenna that transmits radio frequency signals in a plurality of directions toward the entity. In some embodiments, the Wi-Fi antenna radiates Wi-Fi signals toward the entity (e.g., 2.4 GHz, 5 GHZ, 6 GHZ). In some embodiments, the Wi-Fi transmission transmitted by the Wi-Fi transmitter toward the entity is transmitted separately from Wi-Fi data communication signals and separately from Wi-Fi control signals. In some embodiments, the 5G NR transmission transmitted via the 5G NR transmitter toward the entity is transmitted separately from 5G NR data communication signals and separately from 5G NR control signals. In some embodiments, the Bluetooth receiver is a Bluetooth ultra-wideband receiver and the Bluetooth transmitter is a Bluetooth ultra-wideband transmitter. In some embodiments, the Bluetooth receiver is a Bluetooth low energy receiver and the Bluetooth transmitter is a Bluetooth low energy transmitter. In some embodiments, the Bluetooth transmitter is a beacon transmitter.

In some embodiments, the radio frequency data can be received at the Bluetooth receiver and the Wi-Fi receiver based on one or more radio frequency signals from each of the Bluetooth transmitter and the Wi-Fi transmitter that reflected or refracted from the entity. For example, in some embodiments, the Bluetooth transmission reflected from the entity and the Wi-Fi transmission refracted from the entity. In other embodiments, the Bluetooth transmission refracted from the entity and the Wi-Fi transmission reflected from the entity. In an embodiment, the Bluetooth transmission and the Wi-Fi transmission reflected from the entity. In another embodiment, the Bluetooth transmission and the Wi-Fi transmission refracted from the entity. Accordingly, the depth measurement can be determined from the radio frequency data received by the Bluetooth receiver and the Wi-Fi receiver based on one or more of the transmission reflecting or refracting from the entity. In some embodiments, user device 102D can generate the three-dimensional recreation of the entity using the two-dimensional image data and the depth measurement received over the wireless telecommunications network 108.

In some embodiments, one or more images or videos of the entity can be captured by one or more image sensors (e.g., an image sensor of user device 102A, 102B, 102C, or another device) during the museum event (e.g., a museum exhibit opened during a time period during a day) within the museum environment 130. Based on identifying the entity within one or more of the images or videos, one or more radio frequency signals can be transmitted from one or more radio frequency transmitters (e.g., of user device 102A, 102B, 102C or another device). Based on the radio frequency signals, a surface characteristic of the entity (e.g., a shape, a texture, a size, a material) can be determined based on the radio frequency receiver (e.g., of user device 102A, 102B, 102C, or another device) receiving the radio frequency data in response to the one or more radio frequency signals reflecting or refracting from the entity. As such, the determined surface characteristic can be transmitted over the wireless telecommunications network 108, and user device 102D can generate the three-dimensional recreation of the entity using the two-dimensional image data, the determined surface characteristic, and the depth measurement (determined from one or more of the refracted radio frequency signal 134 received by user device 102A that was transmitted by user device 102B and the reflected radio frequency signal 136 that was transmitted and received by user device 102C).

In embodiments, one or more of user devices 102A-102C have an acoustic transmitter and receiver for generating and receiving acoustic signals and acoustic data. The "acoustic signal" generated by the acoustic transmitter may include acoustic waves, which may include but are not limited to one or more of ultrasonic waves, sound waves, other types of electrical waves, or one or more combinations thereof. In some embodiments, an acoustic receiver includes a piezo-electric receiver array, an ultrasonic receiver array, one or more sound transducers, a capacitive micro-machined ultrasonic transducer array, one or more microphone antennas, a bi-directional acoustic receiver, another type of acoustic receiver, or one or more combinations thereof. In some embodiments, the acoustic receiver is an omni-directional microphone, a headset microphone, a microphone configured to sweep an area by rotating, a remote wired microphone, a wireless microphone, another type of microphone, or one or more combinations thereof.

The "acoustic data" received by the acoustic receiver may include, but is not limited to, acoustic pressure, particle velocity, particle displacement, acoustic intensity, reverberation time, impulse response, a reflection angle, a refraction angle, another type of acoustic data, or one or more combinations thereof. In embodiments, the acoustic transmitter has an array of acoustic transducers for transmitting acoustic signals. In some embodiments, the acoustic transmitter can subsequently transmit a second set of acoustic signals in a direction toward the museum artifact 132 that is different than an initial direction in which a first set of acoustic signals were transmitted. In some embodiments, the acoustic transmitter is an excitation source, an energy source, a vibration source, a surface acoustic wave source, another type of acoustic transmitter, or one or more combinations thereof. In some embodiments, the acoustic transmitter has one or more amplifiers or one or more conditioning circuits.

In some embodiments, the acoustic transmitter (e.g., a microphone configured to sweep an area by rotating) transmits one or more acoustic signals (toward the entity identified (e.g., the museum artifact 132)) and the acoustic receiver receives acoustic data via the acoustic receiver based on the one or more acoustic signals reflecting or refracting from the entity. For example, the microphone can receive the acoustic data based on the microphone sweeping the area associated with the museum artifact 132. In one embodiment, the acoustic transmitter transmits the one or more acoustic signals in a first direction, and the acoustic receiver receives the acoustic data from a second direction. In embodiments, one or more processors (e.g., a system-on-a-chip, a processor core, a graphics processor unit, a central processing unit, a neural network processing unit) of a user device having the acoustic receiver, of a server, or of user device 102D can determine a depth measurement of the entity (e.g., the museum artifact 132) based on the acoustic data received for generating the three-dimensional recreation of the entity. For example, the depth measurement can be relative to one or more of the acoustic receivers and the acoustic transmitter. To illustrate, the depth measurement can be determined based on the acoustic pressure transmitted and received, the particle velocity transmitted and received, one or more displacement amplitudes, the acoustic intensity transmitted and received, an incident angle, a reflective angle, other types of acoustic data, or one or more combinations thereof. In another embodiment, an acoustic transmitter of user device 102A transmits the acoustic signal and an acoustic receiver of user device 102B or 102C receives the acoustic data based on the acoustic signal transmission being reflected or refracted from the museum artifact 132.

In some embodiments, the depth measurement can be determined from one or more SNR based on the acoustic signals transmitted and the acoustic data received at the acoustic receiver. In some embodiments, the depth measurement can be determined from a direct-to-reverberant ratio (ratio of energy of direct sound to energy of reverberation), an early-to-late energy ratio (e.g., a ratio of energies of early reflections to energies of late reflections arriving after a delay, or a ratio of energies of early refractions to energies of late refractions arriving after a delay), or one or more combinations thereof (based on the acoustic signals transmitted and the acoustic data received at the acoustic receiver). In some embodiments, based on the acoustic signals transmitted and the acoustic data received at the acoustic receiver, the depth measurement can also be determined based on a surface (e.g., a surface texture, grain size, orientation, component microstructure, shape) of the entity (e.g., the museum artifact 132). In an embodiment, the depth measurement is determined based on the acoustic signals transmitted and the acoustic data received by each of the user devices 102A-102C.

Additionally, the depth determination can be based on location data associated with a user device (e.g., user device 102A-102C), one or more sensors, one or more transmitters or receivers, or one or more combinations thereof. For example, a user device may have one or more accelerometers, one or more gyroscopes, one or more magnetometers, another type of motion sensor, another type of location sensor, or one or more combinations thereof. In an embodiment, the depth measurement is determined based on location data corresponding to one or more of the radio frequency transmitter, radio frequency receiver, acoustic transmitter, acoustic receiver, Wi-Fi transmitter, Wi-Fi receiver, Bluetooth transmitter, Bluetooth receiver, image sensor, user device 102A, user device 102B, user device 102C, location data within metadata of the image data, or one or more combinations thereof.

Base station 114 and satellites 120A-120B may communicate with the wireless telecommunications network 108 via a core network, one or more network components (e.g., a core network node, a relay device, an integrated access and backhaul node, a macro eNB, a small cell eNB, a gNB, a relay base station), or one or more combinations thereof. In some embodiments, the base station 114, satellite 120A, or satellite 120B, communicates with the wireless telecommunications network 108 over one or more backhaul links (e.g., via an X2, Xn, or other interface) either directly (e.g., directly between base stations), or indirectly (e.g., via core network), or one or more combinations thereof. The backhaul links may be or include one or more wireless links, for example. As such, one or more of the radio frequencies signals 134 and 136 (within museum environment 130) and the transmission of the depth measurement or the radio frequency data received to the user device 102D or 102E can correspond to the communications between one or more of base station 114, satellite 120A and satellite 120B.

In embodiments, base station 114 may operate using MIMO transmissions. For example, the base station 114 can be configured as FD-MIMO, massive MIMO, MU-MIMO, cooperative MIMO, 3G, 4G, 5G, another generation communication system, or one or more combinations thereof, for providing telecommunication services to one or more of user devices 102A-102E. The base station 114 can perform one or more of the following functions: transfer user data, radio channel ciphering and deciphering, integrity protection, header compression, mobility control functions (e.g., handover, dual connectivity), inter-cell interference coordination, connection setup and release, load balancing, distribution for non-access stratum messages, Non-Access Stratum node selection, synchronization, radio access network sharing, multimedia broadcast multicast service, subscriber and equipment trace, radio access network information management, paging, positioning, delivery of warning messages, other functions, or one or more combinations thereof. As such, one or more of the radio frequencies signals 134 and 136 (within museum environment 130) may be associated with the FD-MIMO, massive MIMO, MU-MIMO, cooperative MIMO, 3G, 4G, 5G, the other generation communication system, one or more of the corresponding functions of such system, or one or more combinations thereof.

In some embodiments, one or more base station antennas or antenna arrays of base station 114 may be co-located at an antenna assembly, such as an antenna tower. In some examples, antennas or antenna arrays associated with base station 114 may be located in diverse geographic locations. In some aspects, one or more nodes corresponding to base station 114 may comprise one or more macro cells, one or more small cells, one or more relay base stations, one or more repeaters, one or more femtocells, other types of cells, or one or more combinations thereof. In some embodiments, base station 114 may be movable and therefore provide communication coverage for a moving geographic coverage area 110. Further, terrestrial communication links 116A-116C may use MIMO antenna technology, including spatial multiplexing, beamforming, transmit diversity, other MIMO functions, or one or more combinations thereof. Communication links 116A-116C may be through one or more carriers.

Satellites 120A-120B may communicate with base station 114, user devices 102A-102E, or other high altitude or terrestrial communications devices. "Satellite" may also be referred to as a space vehicle or communication satellite. Satellites 120A-120B may be any suitable type of communication satellite configured to relay communications between different end nodes in a wireless communication system. Satellites 120A-120B may be or include a space satellite, a balloon, a dirigible, an airplane, a drone, an unmanned aerial vehicle, another type of satellite, or one or more combinations thereof. In some examples, the satellites 120A-120B may be in a geosynchronous or geostationary earth orbit, a low earth orbit, a medium earth orbit, another type of orbit, or one or more combinations thereof. In some embodiments, satellites 120A-120B may be a multi-beam satellite configured to provide service for multiple service beam coverage areas in a predefined geographical service area (e.g., coverage area 110). The satellites 120A-120B may be any distance away from the surface of the earth.

In some embodiments, satellites 120A-120B may be deployed at an altitude of 18 km to 25 km (e.g., a geostationary balloon satellite), wherein the stratosphere has low wind speeds (e.g., 5 m/s to 40 m/s) and low turbulence. In embodiments, satellites 120A and 120B may be configured to communicate with each other (e.g., via communication link 126). As such, the communication link 126 may include a free space optical link, a microwave link, electromagnetic wave signals via mmWaves, optical signals via a laser, another type of communication link, or one or more combinations thereof. In embodiments, satellites 120A-120B may be configured to communicate via a wireless common public radio interface protocol, a dedicated wireless front haul protocol developed for high-altitude-to-high-altitude, another protocol, or one or more combinations thereof.

In some embodiments, one or more portions of coverage area 110 may be provided or established by satellites 1120A-120B as part of a non-terrestrial network. Satellites 120A-120B may, in some cases, perform the functions of base station 114 or may act as a bent-pipe satellite, act as a regenerative satellite, act as another type of satellite, or one or more combinations thereof. In other cases, satellites 120A-120B may be a smart satellite, or a satellite with intelligence. For example, a smart satellite may be configured to perform more functions than a regenerative satellite (e.g., may be configured to perform particular algorithms beyond those used in regenerative satellites or to be reprogrammed, for example). A bent-pipe transponder or satellite may be configured to receive signals from ground base stations (e.g., base station 114) and transmit those signals to different ground base stations. In some embodiments, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, another type of satellite or regenerative transponder function, or one or more combinations thereof. For example, a bent-pipe satellite may receive a signal from a base station and may relay the signal to a user device or base station, or vice-versa.

User devices 102A-102E may communicate with satellites 120A-120B using communications links 122A or 124A. In embodiments, base station 114 can communicate with satellites 120A-120B using communication links 122B and 124B. In some embodiments, timing adjustments may be used to account for propagation delays associated with communications links 122A and 124A. In some embodiments, the determined depth measurements or the radio frequency data for determining depth measurements, the location data corresponding to the image sensors, location data corresponding to the radio frequency transmitters, the location data associated with the museum environment 130, the location data corresponding to the acoustic transmitters and receivers, the location data of the radio frequency receivers, or the location data of user devices 102A-102C, can be transmitted over wireless telecommunication network 108 via one or more of communication links 116A-116C, 122A, 122B, 124A, 124B, 126, or one or more combinations thereof.

FIG. 2A depicts example operating environment 200A for receiving radio frequency data based on one or more radio frequency signals reflecting from an entity (e.g., at the reflecting surface of the entity), and FIG. 2B depicts example operating environment 200B for receiving radio frequency data based on one or more radio frequency signals reflecting from an entity (e.g., at the reflecting surface of the entity). In environment 200A, a radio frequency signal 202 is transmitted by user device 102F, reflected from the reflecting surface of an entity, and the radio frequency 204 is received by a radio frequency receiver of user device 102G based on the angle of incidence associated with the line perpendicular to the reflecting surface and based on the angle of reflectance associated with the line perpendicular to the reflecting surface. Based on the radio frequency 204 received by the radio frequency receiver of user device 102G, a depth measurement of one or more images or videos of the entity captured by one or more of user device 102F or 102G can be determined for the entity within the one or more images or videos.

In some embodiments, the one or more depth measurements determined for the entity within the one or more images or videos can also be determined based on one or more of a type of the radio frequency transmitter (e.g., a horn antenna, a dipole antenna) of the user device 102F, the frequency of the radio frequency 202, the frequency of radio frequency 204, a type of the radio frequency receiver (e.g., a Wi-Fi receiver) of user device 102G, the delay between transmission of radio frequency 202 and receipt of radio frequency 204, antenna power associated with the radio frequency signal 202, separation distance between the radio frequency transmitter of user device 102F and the radio frequency receiver of user device 102G, locations of the user devices 102F and 102G (e.g., GPS data), velocity of the radio frequency 202, velocity of the radio frequency 204, intensity associated with the radio frequency signal 202, intensity of the radio frequency 204, permittivity of the reflective surface, reflection loss, other types of radio frequency data, or one or more combinations thereof.

In environment 200B, a radio frequency signal 206 is transmitted by user device 102C, reflected from the reflecting surface of an entity, and the radio frequency 208 is received by a radio frequency receiver of user device 102C based on the radio frequency 208 reflecting from the reflecting surface. Based on the radio frequency 208 received by the radio frequency receiver of user device 102C, a depth measurement of one or more images or videos of the entity captured by user device 102C can be determined for the entity within the one or more images or videos.

In some embodiments, the one or more depth measurements determined for the entity within the one or more images or videos can also be determined based on one or more of a type of the radio frequency transmitter (e.g., a horn antenna, a dipole antenna) of the user device 102C, the frequency of the radio frequency 206, the frequency of radio frequency 208, a type of the radio frequency receiver (e.g., a Wi-Fi receiver) of user device 102C, the delay between transmission of radio frequency 206 and receipt of radio frequency 208, antenna power associated with the radio frequency signal 206, separation distance between the radio frequency transmitter of user device 102C and the radio frequency receiver of user device 102C, location of the user device 102C (e.g., triangulation data), velocity of the radio frequency 206, velocity of the radio frequency 208, intensity associated with the radio frequency signal 206, intensity of the radio frequency 208, permittivity of the reflective surface, reflection loss, other types of radio frequency data, or one or more combinations thereof.

Example Flowchart

Figure 3:
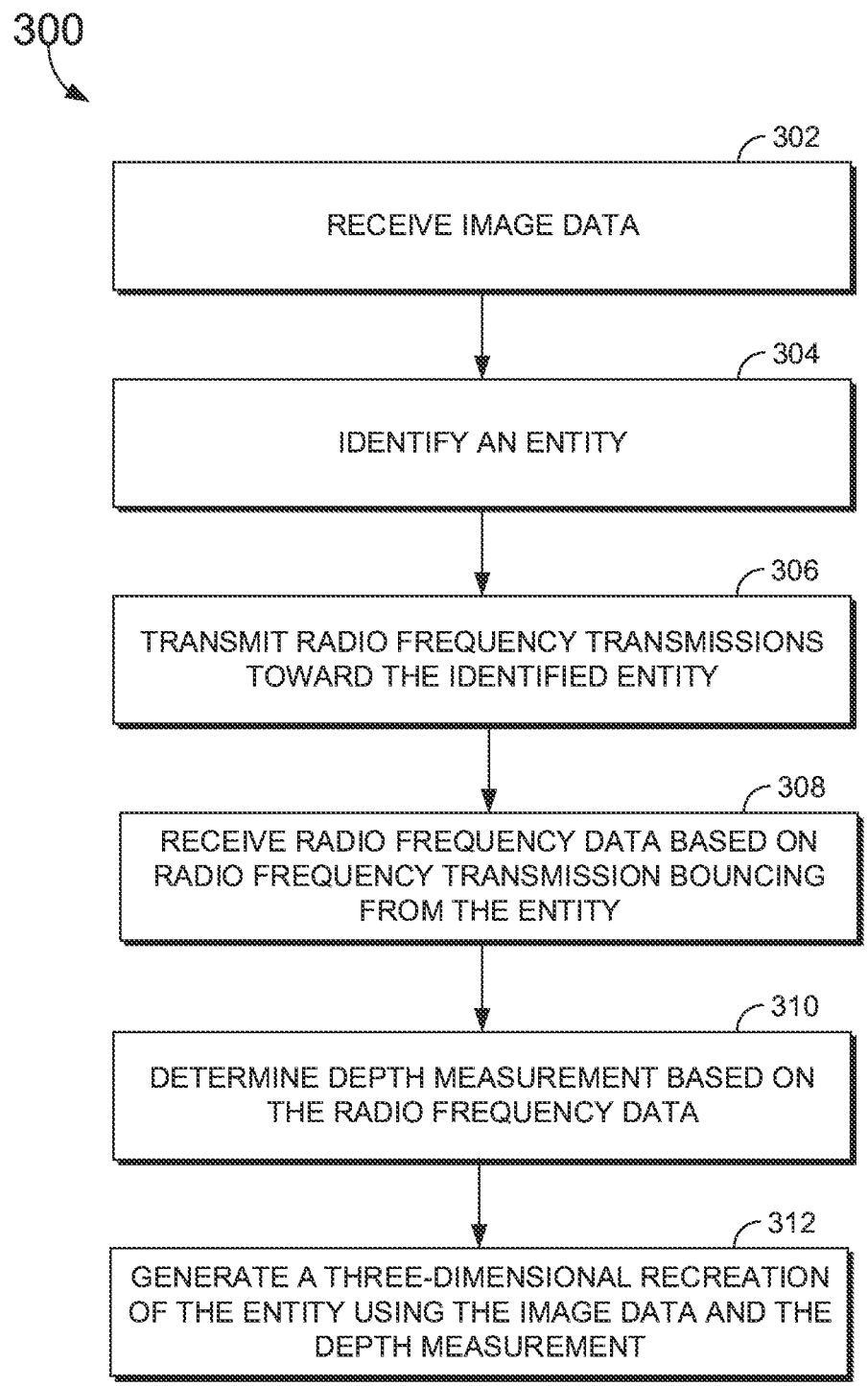
FIG. 3 illustrates an example flowchart for generating a recreation of the virtual entity in three-dimensions, in accordance with aspects herein.

Having described the example embodiments discussed above, an example flowchart is described below with respect to FIG. 3. Example flowchart 300 begin at 302 with receiving image data (e.g., two-dimensional image data) from an image sensor. For example, image data may correspond to one or more still images, one or more sequences of images, video frames, other image types, or one or more combinations thereof. As another example, image data can include ultra-reliable image data, low-latency image data, critical image data, mission critical image data, frame-based image data, video frame data, encoded video data, image or video sensor-mode setting data, zoom setting data, JPEG data, GIF data, BMP data, TIFF data, other types of image data, or one or more combinations thereof. In embodiments, the image sensor can include one or more of a digital camera sensor, a digital video sensor, an optical character recognition sensor, an x-ray sensor, a computed tomography sensor, a magnetic resonance sensor, an ultrasound sensor, a positron-emission tomography sensor, another type of medical imaging sensor, another type of magnetic particle imaging sensor, a 3-D scanning sensor, another type of image sensor, or one or more combinations thereof. In some embodiments, the image sensor is a component of a user device.

At 304, an entity (a human, another organism, an object (e.g., museum artifact 132 of FIG. 1), another type of entity, or one or more combinations thereof) is identified (e.g. within an event, such as a sporting event, a movie event, a play event, a museum display event, a theater event, a performance event) based on the image data. For example, the entity can be identified within an image or within a video. In some embodiments, a first image of the entity is captured during the event using the image sensor of a first user device and a second image of the entity during the event is captured using a second image sensor of a second user device. In some embodiments, one or more videos of the entity are captured during the event using the image sensor. In some embodiments, one or more acoustic receivers capture acoustic data from the environment in which the entity is located.

Further, at 306, based on identifying the entity, one or more radio frequency signals are transmitted from a radio frequency transmitter and toward the entity. In some embodiments, the radio frequency transmitter is a Bluetooth transmitter. Additionally or alternatively, in some embodiments, the radio frequency transmitter is a Wi-Fi transmitter. In some embodiments, the radio frequency signals are transmitted by the radio frequency transmitter, and a Wi-Fi transmitter and Bluetooth transmitter also transmit frequencies toward the entity. In some embodiments, based on identifying the entity, one or more acoustic signals are also transmitted toward the entity from one or more acoustic transmitters.

At 308, radio frequency data is received at the radio frequency receiver based on the one or more radio frequency signals reflecting or refracting from the entity. In some embodiments, the radio frequency signal refract from the entity. In some embodiments, the radio frequency receiver is at a first location and the radio frequency transmitter is at a second location. In some embodiments, the radio frequency data is received by a Bluetooth receiver. In some embodiments, the radio frequency data is received by a Wi-Fi receiver. For example, the method may include receiving the radio frequency data at the Bluetooth receiver and the Wi-Fi receiver based on the one or more radio frequency signals from the Bluetooth transmitter and the Wi-Fi transmitter reflecting or refracting from the entity. In some embodiments, an acoustic signal is received at an acoustic receiver based on the acoustic signal (transmitted by an acoustic transmitter) reflecting or refracting from the entity. In some embodiments, the acoustic transmitter and receiver are at a different location than the image sensor that receives the image data.

At 310, a depth measurement, of the entity identified within the image data, is determined based on the radio frequency data received (e.g., received at a first radio frequency receiver). In some embodiments, the depth measurement is relative to a location of the radio frequency transmitter. Additionally or alternatively, the depth measurement is relative to a location of the radio frequency receiver. In some embodiments, the depth measurement is relative to an incidence angle, a reflection angle, or one or more combinations thereof. In some embodiments, the depth measurement is relative to an incidence angle, a refraction angle, or one or more combinations thereof. In some embodiments, the depth measurement is also determined based on the acoustic data received by the acoustic receiver.

For example, the depth measurement can be determined based on one or more of the acoustic pressure, particle velocity, particle displacement, acoustic intensity, reverberation time, impulse response, a reflection angle, a refraction angle, another type of acoustic data, or one or more combinations thereof, associated with the acoustic signal transmission reflecting or refracting from the entity and being received by the acoustic receiver. In some embodiments, the depth measurement is also determined based on a Bluetooth receiver and a Wi-Fi receiver. In some embodiments, additional depth measurements associated with image data of the entity are determined using the same radio frequency transmitters and receivers or different radio frequency transmitters and receivers at other locations. In some embodiments, the depth measurement of the entity is further determined based on location data extracted from metadata of the two-dimensional image data.

In some embodiments, a shape of a surface of the entity is determined based on the radio frequency receiver of a first user device receiving the radio frequency data and a second radio frequency receiver of a second user device receiving additional radio frequency data in response to additional radio frequency signals from the second user device reflecting or refracting from the entity. In embodiments, the shape of the surface of the entity can be used to determine the depth measurement. In some embodiments, the depth measurement can be determined using a first set of radio frequency data received by the radio frequency receiver, a second set of radio frequency data received by a Bluetooth receiver, and a third set of radio frequency data received by a Wi-Fi receiver. In some embodiments, the depth measurement of the entity is further determined based on location data extracted from metadata of the two-dimensional image data and location data corresponding to one or more radio frequency receivers, and location data corresponding to one or more radio frequency transmitters. In some embodiments, the image sensor, the one or more radio frequency transmitters, and the one or more radio frequency receivers are within a threshold distance from each other.

At 312, the three-dimensional recreation of the entity is generated using the depth measurement and the image data. Additionally, the three-dimensional recreation of the entity can be generated using the determined shape of the surface of the entity. In some embodiments, the three-dimensional recreation of the entity can be generated using a surface texture, grain size, orientation, or component microstructure of the entity. In some embodiments, the three-dimensional recreation of the entity can be generated using a plurality of depth measurements determined for a plurality of images or a plurality of videos of the entity. In some embodiments, the three-dimensional recreation of the entity can be generated using a plurality of surface features (e.g., surface texture, grain size, orientation, shape, or component microstructure) determined for the entity from various points located on one or more surfaces of the entity.

Example User Device

Having described the example embodiments discussed above of the presently disclosed technology, an example operating environment of an example user device (e.g., user device 102A of FIG. 1) is described below with respect to FIG. 4. User device 400 is but one example of a suitable computing environment, and is not intended to suggest any particular limitation as to the scope of use or functionality of the technology disclosed. Neither should user device 400 be interpreted as having any dependency or requirement relating to any particular component illustrated, or a particular combination of the components illustrated in FIG. 4.

Figure 4:
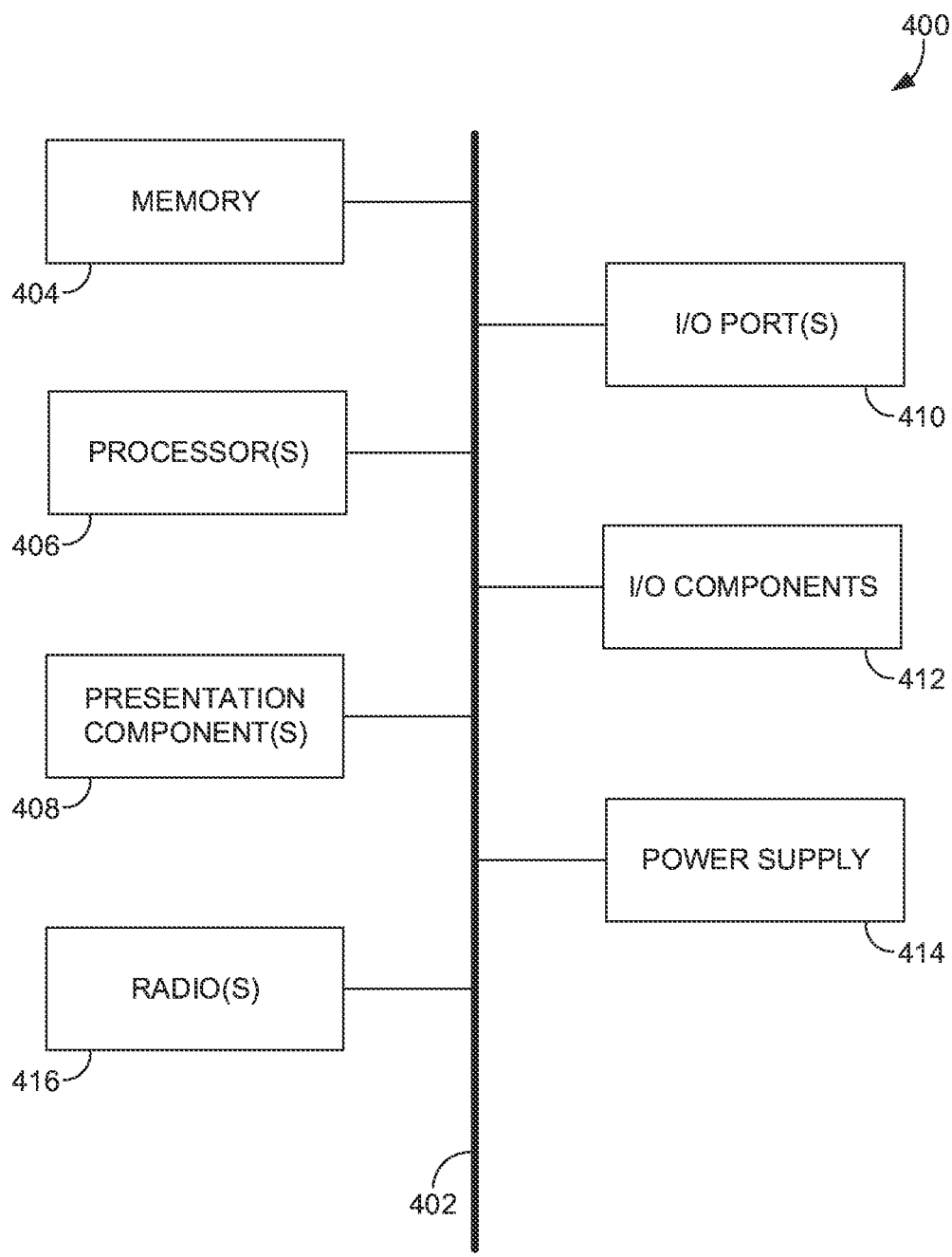
FIG. 4 depicts an example user device suitable for use in implementations of the present disclosure, in accordance with aspects herein.

As illustrated in FIG. 4, example user device 400 includes a bus 402 that directly or indirectly couples the following devices: memory 404, one or more processors 406, one or more presentation components 408, one or more input/output (I/O) ports 410, one or more I/O components 412, a power supply 414, and one or more radios 416.

Bus 402 represents what may be one or more busses (such as an address bus, data bus, or combination thereof). Although the various blocks of FIG. 4 are shown with lines for the sake of clarity, in reality, these blocks represent logical, not necessarily actual, components. For example, one may consider a presentation component, such as a display device, to be an I/O component. Also, processors have memory. Accordingly, FIG. 4 is merely illustrative of an exemplary user device that can be used in connection with one or more embodiments of the technology disclosed herein.

User device 400 can include a variety of computer-readable media. Computer-readable media can be any available media that can be accessed by user device 400 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 400. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 404 includes computer storage media in the form of volatile and/or nonvolatile memory. The memory 404 may be removable, non-removable, or a combination thereof. Example hardware devices of memory 404 may include solid-state memory, hard drives, optical-disc drives, other hardware, or one or more combinations thereof. As indicated above, the computer storage media of the memory 404 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 400, or one or more combinations thereof.

The one or more processors 406 of user device 400 can read data from various entities, such as the memory 404 or the I/O component(s) 412. The one or more processors 406 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 406 can execute instructions, for example, of an operating system of the user device 400 or of one or more suitable applications.

The one or more presentation components 408 can present data indications via user device 400, another user device, or a combination thereof. Example presentation components 408 may include a display device, speaker, printing component, vibrating component, another type of presentation component, or one or more combinations thereof. In some embodiments, the one or more presentation components 408 may comprise one or more applications or services on a user device, across a plurality of user devices, or in the cloud. The one or more presentation components 408 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof.

The one or more I/O ports 410 allow user device 400 to be logically coupled to other devices, including the one or more I/O components 412, some of which may be built in. Example I/O components 412 can include a microphone, joystick, game pad, satellite dish, scanner, printer, wireless device, and the like. The one or more I/O components 412 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 408 on the user device 400. In some embodiments, the user device 400 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 400 may, additionally or alternatively, be equipped with accelerometers or gyroscopes that enable detection of motion. In some embodiments, the output of the accelerometers or gyroscopes may be provided to the one or more presentation components 408 of the user device 400 to render immersive augmented reality or virtual reality.

The power supply 414 of user device 400 may be implemented as one or more batteries or another power source for providing power to components of the user device 400. In embodiments, the power supply 414 can include an external power supply, such as an AC adapter or a powered docking cradle that supplements or recharges the one or more batteries. In aspects, the external power supply can override one or more batteries or another type of power source located within the user device 400.

Some embodiments of user device 400 may include one or more radios 416 (or similar wireless communication components). The one or more radios 416 can transmit, receive, or both transmit and receive signals for wireless communications. In embodiments, the user device 400 may be a wireless terminal adapted to receive communications and media over various wireless networks. User device 400 may communicate using the one or more radios 416 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 416 may facilitate communication via radio frequency signals, frames, blocks, transmission streams, packets, messages, data items, data, another type of wireless communication, or one or more combinations thereof. The one or more radios 416 may be capable of transmitting, receiving, or both transmitting and receiving wireless communications via mmWaves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for recreating an event in three-dimensions from two-dimensional image data using a wireless telecommunications network, the system comprising:
   an image sensor;
   a radio frequency transmitter;
   a radio frequency receiver;
   one or more processors; and
   computer memory storing computer-usable instructions that, when executed by the one or more processors, cause the system to perform operations comprising:
   receiving the two-dimensional image data from the image sensor;
   identifying an entity within the event based on the two-dimensional image data;
   transmitting one or more radio frequency signals, from the radio frequency transmitter, toward the entity;
   receiving radio frequency data at the radio frequency receiver based on the one or more radio frequency signals reflecting from the entity;
   determining a depth measurement of the entity based on the radio frequency data received; and
   transmitting the depth measurement and the two-dimensional image data to the wireless telecommunications network for a three-dimensional recreation of the entity within the event.

2. The system according to claim 1, the system further comprising an acoustic transmitter and receiver, the operations further comprising:
   based on identifying the entity, transmitting one or more acoustic signals toward the entity from the acoustic transmitter;
   receiving acoustic data from the acoustic receiver based on the one or more acoustic signals reflecting or refracting from the entity;
   determining the depth measurement of the entity based on the acoustic data received; and
   generating the three-dimensional recreation of the entity using the two-dimensional image data and the depth measurement.

3. The system according to claim 1, wherein the radio frequency receiver comprises at least one of a Bluetooth receiver or a Wi-Fi receiver, and wherein the radio frequency transmitter comprises at least one of a Bluetooth transmitter and a Wi-Fi transmitter.

4. The system according to claim 3, wherein the system further comprises a Bluetooth receiver, a Bluetooth transmitter, a Wi-Fi transmitter, and a Wi-Fi receiver, the operations further comprising:
   based on identifying the entity, transmitting the one or more radio frequency signals from the Bluetooth transmitter and the Wi-Fi transmitter;
   receiving the radio frequency data at the Bluetooth receiver and the Wi-Fi receiver based on the one or more radio frequency signals from the Bluetooth transmitter and the Wi-Fi transmitter reflecting from the entity;
   determining the depth measurement of the entity based on the Bluetooth receiver and the Wi-Fi receiver receiving the radio frequency data; and
   generating the three-dimensional recreation of the entity using the two-dimensional image data and the depth measurement.

5. The system according to claim 1, wherein the system comprises a first user device having the image sensor, the radio frequency transmitter, and the radio frequency receiver, and a second user device having a second image sensor, a second radio frequency transmitter, and a second radio frequency receiver, the operations further comprising:
   capturing a first image of the entity during the event using the image sensor of the first user device and capturing a second image of the entity during the event using the second image sensor of the second user device;
   based on identifying the entity within the first image and the second image, transmitting the one or more radio frequency signals from the radio frequency transmitter of the first user device and transmitting additional radio frequency signals from the second radio frequency transmitter of the second user device to the entity;
   determining a shape of a surface of the entity based on the radio frequency receiver of the first user device receiving the radio frequency data and the second radio frequency receiver receiving additional radio frequency data in response to the one or more radio frequency signals and the additional radio frequency signals reflecting or refracting from the entity;
   transmitting the determined shape of the surface of the entity over the wireless telecommunications network; and
   based on transmitting the determined shape of the surface of the entity, generating the three-dimensional recreation of the entity using the two-dimensional image data, the determined shape, and the depth measurement.

6. The system according to claim 5, the operations further comprising:
   determining a second depth measurement of the entity based on the additional radio frequency data received by the second radio frequency receiver of the second user device;
   transmitting two-dimensional image data of the second image and the second depth measurement over the wireless telecommunications network; and
   generating the three-dimensional recreation of the entity using the second depth measurement and the two-dimensional image data of the second image.

7. The system according to claim 1, the operations further comprising:
   capturing a video of the entity during the event using the image sensor;
   identifying the entity within the event using the two-dimensional image data of the video; and based on transmitting the depth measurement and the two-dimensional image data of the video over the wireless telecommunications network, generating the three-dimensional recreation of the entity using the two-dimensional image data of the video and the depth measurement.

8. The system according to claim 1, wherein the depth measurement and two-dimensional image data are transmitted to the wireless telecommunications network using a transmission frequency that is different from the frequency of the one or more radio frequency signals transmitted toward the entity.

9. A method for generating a three-dimensional recreation of an entity, the method comprising:
receiving image data from an image sensor;
identifying the entity based on the image data;
transmitting one or more radio frequency signals toward the entity via one or more radio frequency transmitters;
receiving radio frequency data at a radio frequency receiver based on the one or more radio frequency signals reflecting from the entity;
determining a depth measurement of the entity based on the radio frequency data received; and
transmitting the depth measurement and the image data over a wireless telecommunications network.

10. The method according to claim 9, further comprising:
based on identifying the entity, transmitting a first radio frequency signal from a Bluetooth transmitter;
receiving the radio frequency data at a Bluetooth receiver based on the first radio frequency signal reflecting or refracting from the entity; and
determining the depth measurement of the entity based on the Bluetooth receiver receiving the first radio frequency signal.

11. The method according to claim 10, further comprising:
based on identifying the entity, transmitting a second radio frequency signal from a Wi-Fi transmitter;
receiving the radio frequency data at a Wi-Fi receiver based on the second radio frequency signal reflecting or refracting from the entity; and
determining the depth measurement of the entity based on the Wi-Fi receiver receiving the second radio frequency signal.

12. The method according to claim 11, further comprising:
based on identifying the entity, transmitting an acoustic signal toward the entity via one or more acoustic transmitters;
receiving the acoustic signal at an acoustic receiver based on the acoustic signal reflecting or refracting from the entity; and
determining the depth measurement of the entity based on the acoustic receiver receiving the acoustic signal.

13. The method according to claim 9, further comprising:
capturing a first video of the entity using the image sensor of a first user device and a second video of the entity using a second image sensor of a second user device;
receiving, the image data corresponding to the first video from the first user device;
based on identifying the entity within the second video, transmitting radio frequency signals from a second radio frequency transmitter of the second user device and to the entity;
receiving additional radio frequency data at a second radio frequency receiver of the second user device based on the radio frequency signals, transmitted from the second radio frequency transmitter, reflecting or refracting from the entity;
determining a second depth measurement of the entity relative to the second video based on the additional radio frequency data received by the second user device;
transmitting the second depth measurement and the second video over the wireless telecommunications network; and
generating the three-dimensional recreation of the entity using the depth measurement, the first video, the second depth measurement, and the second video.

14. The method according to claim 13, the method further comprising:
determining a shape of a surface of the entity based on the radio frequency data received by the first user device and the additional radio frequency data received by the second user device;
transmitting the determined shape of the surface of the entity over the wireless telecommunications network; and
generating the three-dimensional recreation of the entity using the determined shape.

15. One or more non-transitory computer storage media having computer-executable instructions embodied thereon, that when executed by at least one processor, cause the at least one processor to perform a method comprising:
receiving two-dimensional image data from an image sensor;
identifying an entity corresponding to the two-dimensional image data;
based on identifying the entity, transmitting a plurality of radio frequency signals toward the entity from at least one of a plurality of radio frequency transmitters;
receiving radio frequency data at a first radio frequency receiver based on a first radio frequency signal of the plurality of radio frequency signals reflecting from the entity;
determining a depth measurement of the entity for the two-dimensional image data based on the radio frequency data received at the first radio frequency receiver; and
causing transmission of the depth measurement and the two-dimensional image data over a wireless telecommunications network for a three-dimensional recreation of the entity.

16. The one or more non-transitory computer storage media of claim 15, wherein another radio frequency transmitter of the plurality of radio frequency transmitters includes a Wi-Fi transmitter, the method further comprising:
receiving the radio frequency data at a second radio frequency receiver based on a second radio frequency signal from the Wi-Fi transmitter and based on the second radio frequency signal reflecting or refracting from the entity; and
determining the depth measurement of the entity based on the second radio frequency receiver receiving the second radio frequency signal.

17. The one or more non-transitory computer storage media of claim 16, wherein another radio frequency transmitter of the plurality of radio frequency transmitters includes a Bluetooth transmitter, the method further comprising:
receiving the radio frequency data at a third radio frequency receiver based on a third radio frequency signal from the Bluetooth transmitter and based on the third radio frequency signal reflecting or refracting from the entity; and determining the depth measurement of the entity based on the third radio frequency receiver receiving the third radio frequency signal.

18. The one or more non-transitory computer storage media of claim 15, the method further comprising:

based on identifying the entity, transmitting an acoustic signal toward the entity via an acoustic transmitter;

receiving the acoustic signal at an acoustic receiver based on the acoustic signal reflecting or refracting from the entity; and determining the depth measurement of the entity based on the acoustic receiver receiving the acoustic signal.

19. The one or more non-transitory computer storage media of claim 18, wherein the depth measurement of the entity is further determined based on location data extracted from metadata of the two-dimensional image data and location data corresponding to the acoustic transmitter and receiver, wherein the acoustic transmitter and receiver are at a different location than the image sensor.

20. The one or more non-transitory computer storage media of claim 15, wherein the depth measurement of the entity is further determined based on location data extracted from metadata of the two-dimensional image data and location data corresponding to the first radio frequency receiver and the at least one of the plurality of radio frequency transmitters, wherein the image sensor, the at least one of the plurality of radio frequency transmitters, and the first radio frequency receiver are within a threshold distance from each other.

* * * * *